May 22, 1951  R. W. CRIST  2,553,897

MATERIAL HANDLING APPARATUS

Filed April 3, 1947  3 Sheets-Sheet 1

INVENTOR.
ROBERT W. CRIST
BY
Kwis, Hudson, Boughton & Williams
ATTORNEYS

May 22, 1951  R. W. CRIST  2,553,897
MATERIAL HANDLING APPARATUS
Filed April 3, 1947  3 Sheets-Sheet 2
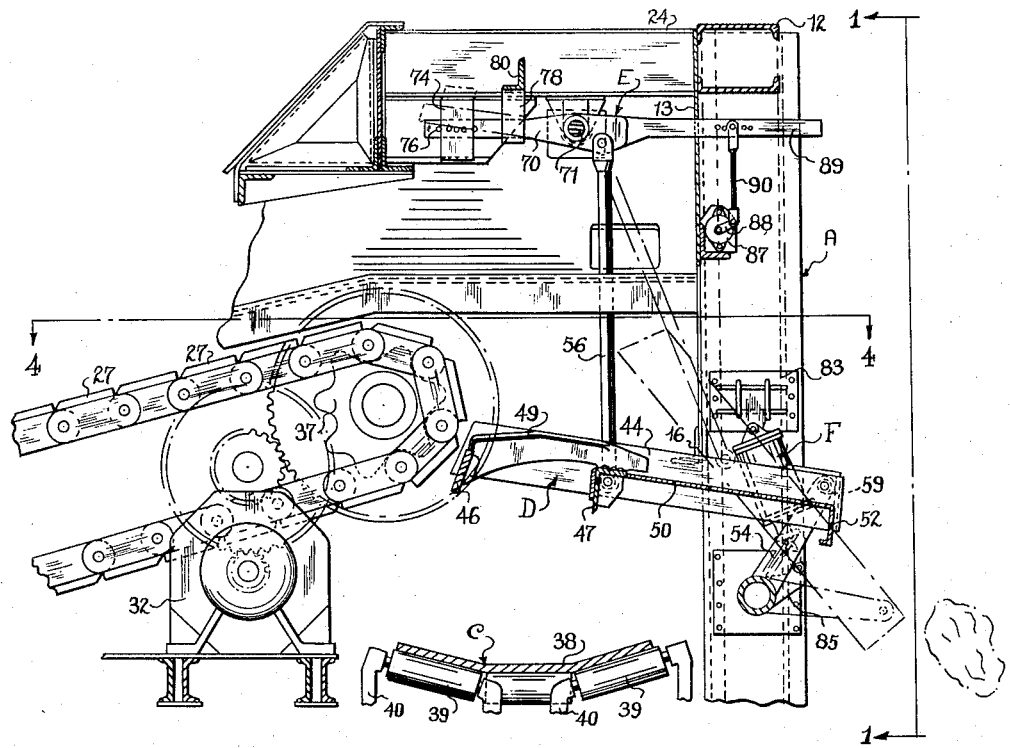
Fig. 2
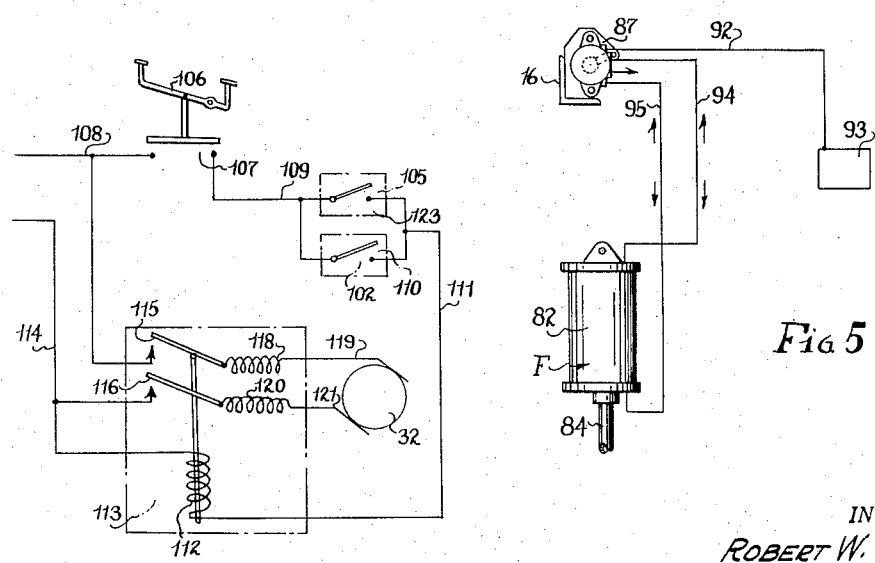
Fig. 6
Fig. 5
INVENTOR.
ROBERT W. CRIST
BY
Kwis, Hudson, Boughton & Williams
ATTORNEYS Patented May 22, 1951

2,553,897

UNITED STATES PATENT OFFICE 2,553,897

MATERIAL HANDLING APPARATUS

Robert W. Crist, Cleveland, Ohio, assignor to The Wellman Engineering Company, Cleveland, Ohio, a corporation of Ohio Application April 3, 1947, Serial No. 739,189

11 Claims. (Cl. 209—260)

This invention relates to material handling equipment and, more particularly, to material handling equipment capable of separating or screening out oversize or large lumps or pieces.

One of the principal objects of the invention is the provision of a new and improved tilting grizzly for use in screening or separating large or bulky pieces from material or objects of different sizes such as, but not limited to, coal, iron ore, or the like, which grizzly is operable in a simple, rapid, and expeditious manner to eject or divert such pieces.

A further object of the invention is the provision of a new and improved tilting grizzly of the type referred to including power actuated tilting means and weight sensitive apparatus for controlling the power tilting means, the grizzly at least in part being continuously supported from the weight sensitive apparatus even when tilted so as to detect when the material lodged on the grizzly has been removed and primptly return the grizzly to its normal operative position.

A further object of the invention is the provision of a new and improved tilting grizzly of the power actuated type for diverting large pieces from a movement of material or objects of variable sizes, including means for detecting when one or a plurality of pieces or lumps have been stopped by the grizzly, tilting the grizzly to eject the pieces, and temporarily stopping further movement of material to the grizzly until the pieces or lumps thereon have been ejected.

A further object of the invention is the provision of a new and improved material handling system, including a power operated tilting grizzly of the type referred to, means for supplying a generally continuous flow of material to the grizzly, and control apparatus for tilting the grizzly, stopping the flow of material to the grizzly while the grizzly is tilted, and when large pieces on the grizzly are dislodged for returning the grizzly to its original position and starting the flow of material thereto.

A still further object of the invention is the provision of a new and improved apparatus for handling iron ore, including an endless belt type conveyor, a power operated tilting grizzly located at the discharge end of the conveyor, weight sensitive apparatus for detecting when the grizzly has screened one or a plurality of oversize pieces or lumps, and control apparatus operable automatically by the weight sensitive apparatus for tilting the grizzly, stopping the conveyor while the grizzly is tilted, and when the oversize pieces or lumps are dislodged from the grizzly for returning the grizzly to its original position and restarting the conveyor.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which:

Fig. 2 is a fragmentary sectional view approximately on the line 2—2 of Fig. 1;

Fig. 5 is a diagram of the hydraulic equipment for tilting the grizzly; and

Fig. 6 is a wiring diagram of the electrical control circuits associated with the grizzly.

Figure 1:
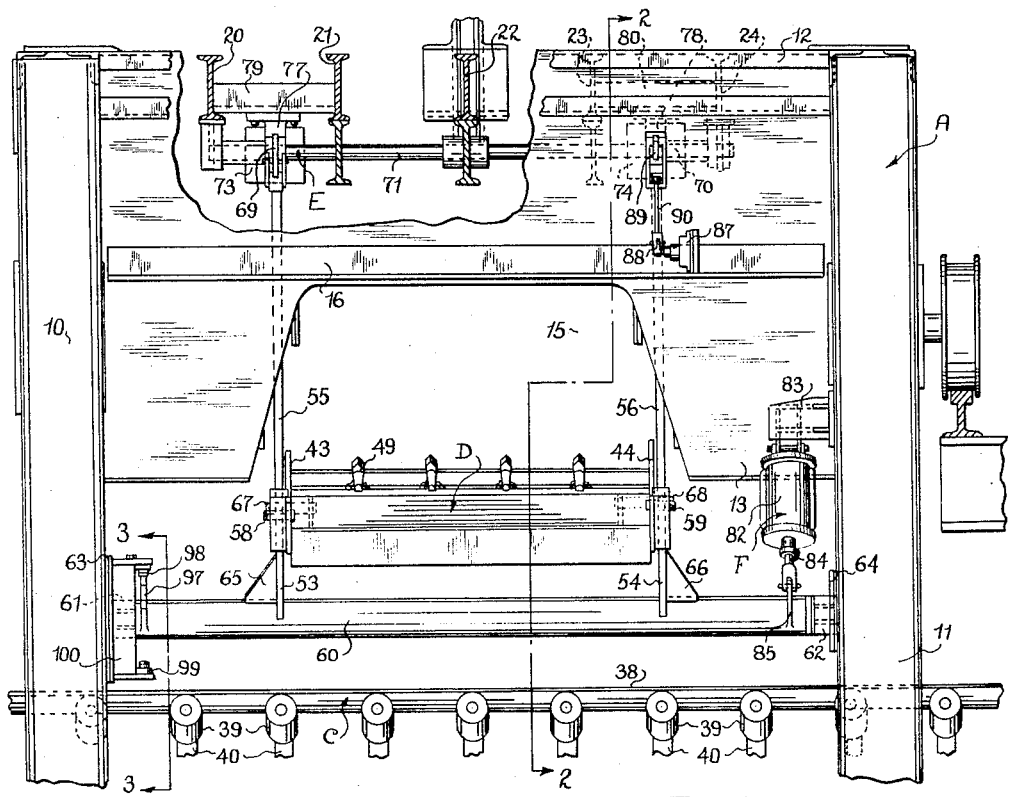
Fig. 1 is a fragmentary view approximately on the line 1—1 of Fig. 2 of an iron ore unloading device embodying the present invention.
Figure 3:
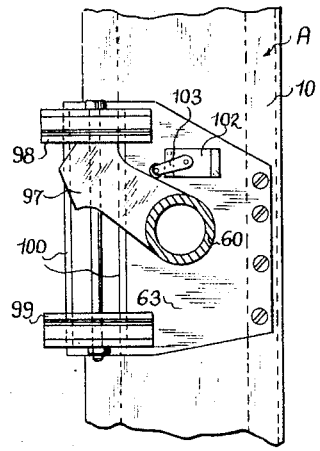
Fig. 3 is a sectional view approximately on the line 3—3 of Fig. 1.
Figure 4:
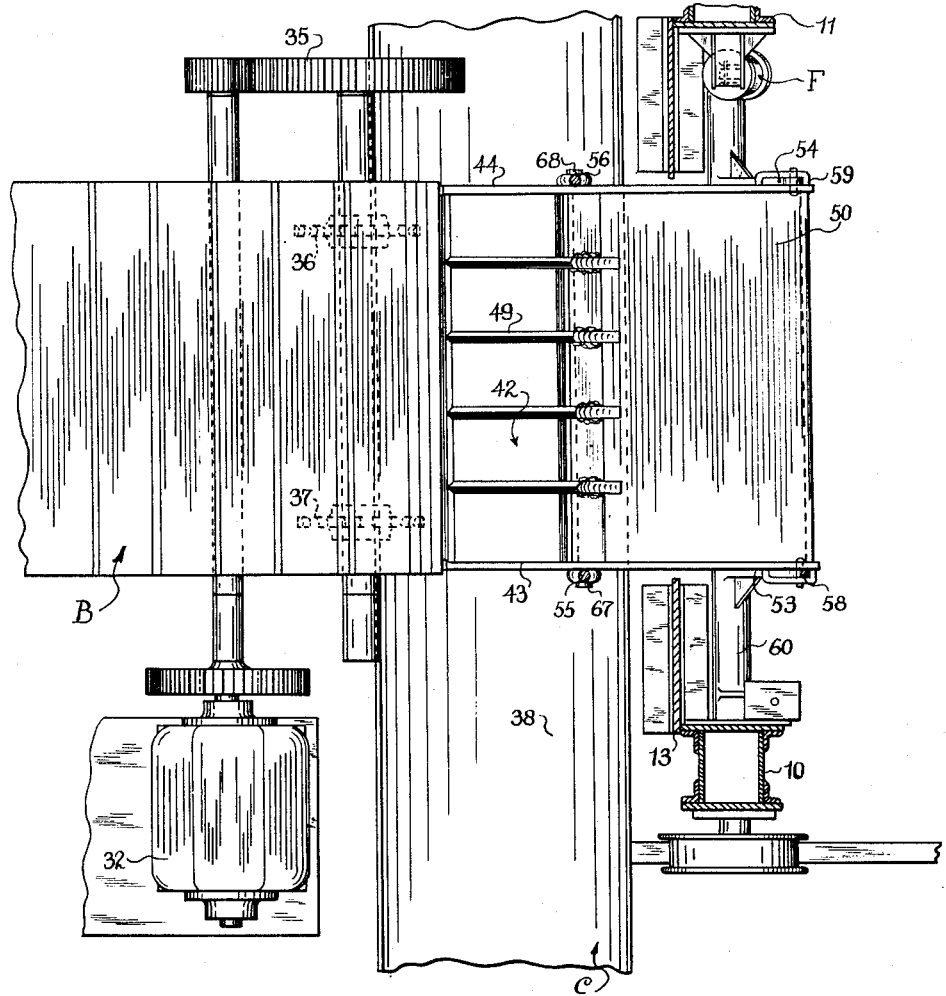
Fig. 4 is a fragmentary sectional plan view approximately on the line 4—4 of Fig. 2.

While the invention is applicable to various types of conveyor mechanisms or otherwise adapted for handling material wherein lumps or other pieces over a predetermined size are to be separated, it is particularly applicable to and is herein shown and described as applied to a Hulett type unloader commonly employed for unloading iron ore and the like from boats. Such unloaders are well known and include a bridge movable longitudinally of the dock and a trolley supported on the bridge for movement toward and from the boat. The trolley is provided with a grab bucket movable into and out of the hold of a ship for transferring the material from the ship usually to a hopper in the forward end of the bridge. From the hopper the material may be discharged directly into freight cars, or it may be otherwise disposed of as desired.

In the present embodiment, the hopper in the forward end of the bridge is movable transversely of the dock so that the bucket can be dropped through the bridge to the dock below. For this purpose the hopper is carried by a hopper and conveyor frame movably supported on the bridge by wheels movable along rails fixed to the bridge. The bottom of the hopper is formed by a feeder conveyor carried by the hopper conveyor frame and movable therewith. This conveyor extends transversely of the length of the dock and the rear end thereof discharges through a grizzly onto a second conveyor extending generally parallel to and spaced from the edge of the dock. The second conveyor may discharge into freight cars or onto a third conveyor also carried by the Hulett leading to a stockpile or the like.

Only those parts of the Hulett and associated apparatus are herein shown and described which are necessary to a complete understanding of the present invention. Only a portion of the hopper conveyor frame and the rear or discharge end of the feeder conveyor mentioned above are shown in the drawings, where they are identified by the reference characters A, B, respectively. The second or lower conveyor, designated C, disposed below the discharge end of the feeder conveyor B receives the material discharged therefrom through a tilting grizzly D having measuring openings of a predetermined size adapted to screen the material. Weight sensitive apparatus E detects oversize or large pieces or lumps of material failing to pass through the measuring openings, and controls power means F for tilting or moving the grizzly and ejecting such oversize or large pieces or lumps.

The portion of the hopper conveyor frame A shown comprises a pair of spaced vertical upright members 10, 11 rigidly held in such spaced relationship by a horizontal transverse beam 12 extending between the upper ends thereof and a transverse vertical plate 13 of substantial vertical height extending between and welded or otherwise fixed to the sides of the upright members 10, 11 and the horizontal beam 12. The lower edge of the transverse vertical plate 13 is cut away intermediate its ends as at 15 for providing operating clearance for the grizzly D. An angle iron 16 extends transversely of the plate 13 immediately above the upper edge of the opening 15 and provides longitudinal stability and rigidity to the plate. The hopper conveyor frame A also includes a plurality of spaced I-beams 20, 21, 22, 23, 24 extending forwardly from the transverse beam 12, reference to which will hereinafter be made.

The first or feeder conveyor B is supported by the hopper conveyor frame and, as shown, comprises a plurality of relatively articulated treads or shoes 27 positioned end-to-end forming a continuous belt driven by suitable mechanism including an electric motor 32, speed-reducing gear assemblies 34, 35, and sprocket members 36, 37. The second or lower conveyor mechanism C comprises an endless flexible belt 38 supported for continuous movement on suitable antifriction supporting rollers 39, which rollers are in turn rotatably supported on suitable members 40 forming a part of the hopper conveyor frame A.

In operation, the first or feeder conveyor B discharges the material received from the hopper from its right hand or discharge end onto the second or lower conveyor C positioned therebelow. For stopping and ejecting or diverting oversize lumps or large pieces contained in the material moving from the one conveyor belt to the other, the grizzly D has a plurality of adjacent measuring openings 42 and is supported between the upright members 10, 11 for tilting movement with the openings 42 normally positioned immediately below the discharge end of the feeder conveyor B such that all of the material reaching the lower conveyor C must pass through the openings. Any lumps or pieces of material larger than the size of the openings will, of course, be prevented from passing therethrough and may be ejected over the right hand end of the grizzly which as shown is spaced horizontally from the lower conveyor.

The grizzly D shown is preferably of built-up welded construction and comprises a pair of spaced and parallel side frame members 43, 44, and spaced transversely extending cross members 46, 47 welded at their ends to the side frame members with their upper edges disposed below the upper edge of the side frame members 43, 44. The forward or left hand end of the side frame members 43, 44, the member 46, and the member 47 define a chute or opening in the grizzly through which the material reaching the lower conveyor must pass. Spaced grizzly bars 49 extend longitudinally of the grizzly or parallel to the side frame members between the transverse members 46, 47 and may be welded at their ends to the upper edges thereof. The openings 42 may be varied in size from that shown by using more or less grizzly bars, by varying their width, or by adjustably positioning them on the grizzly by suitable means. The grizzly bars divide the size of the chute or opening into the measuring or screening openings 42 of predetermined size. As shown, the grizzly bars 49 preferably have a sharp or angular knifelike corner forming the uppermost edge.

The grizzly shown also includes a platelike web member 50 positioned between and welded to the side frame members 43, 44 with its upper surface approximately midway between the upper and lower edges of the side frame members. The forward edge of the web member 50 is substantially flush with the upper edge of the transverse member 47, while the right hand edge preferably terminates in a downwardly extending right-angled flange 52 providing rigidity thereto. The upper edges of the side frame members 43, 44 and the upper surface of the web member 50 form a chute or guiding channel through which the large lumps or pieces of material failing to pass through the openings 42 are ejected clear of the lower conveyor C. Other constructions of the grizzly might also be provided.

The grizzly D is preferably normally held in a slightly tilted position whereby some large lumps or pieces failing to pass between the grizzly bars 49 may roll off to the rear of their own accord. The grizzly, however, is also so disposed and mounted that it may be tilted further a sufficient amount to allow any large lumps or pieces of material caught between or lodged on the grizzly bars 49 to be dislodged therefrom by the force of gravity or otherwise. The grizzly may be mounted for tilting in a number of ways, such as by providing for raising either end, by providing for lowering either end, or by providing for raising one end and lowering the other. The preferred embodiment of the invention contemplates the latter method.

The right or discharge end of the grizzly D thus is supported on generally vertically extending and slightly inclined lever arms 53, 54 rotatable about an axis positioned below the grizzly, while the left or measuring opening end hangs or depends from elongated vertically extending tension bars 55, 56 fixed to a support, which in the embodiment shown includes the weight sensitive apparatus E, above the grizzly and displaced horizontally forward or to the left from the axis of pivoting of the lever arms 53, 54.

The lever arms 53, 54 are pivoted relative to the right end of the side frame members 43, 44 by suitable short shafts 58, 59, while the lower ends are welded or otherwise fixed to a shaft 60 extending transversely between the upright members 10, 11 and journaled at the ends in suitable bearing members 61, 62, including supporting plates 63, 64 fixed to the members 10, 11, respectively. Gusset or reinforcing plates 65, 66 welded to the shaft 60 and the lever arms 53, 54, respectively, provide lateral stability for the lever arms.

The lower ends of the tension bars 55, 56 are pivoted relative to the side frame members 43, 44 by suitable short shafts 67, 68 at a point preferably just to the right of the openings 42, and the upper ends thereof are suitably pivoted on the weight sensitive apparatus E at a point preferably vertically above the point of attachment to the side frame members.

The weight sensitive apparatus E comprises a pair of spaced horizontally-extending elongated balance beams 69, 70 mounted for a limited degree of oscillation on a common transversely extending shaft 71 rotatably supported in suitable bearings carried by the forwardly extending beams 20, 22, 24. The upper ends of the tension bars 55, 56 are pivotally fixed to the balance beams 69, 70, respectively, at a predetermined but preferably short distance to the right of the axis of oscillation of the beams. It will be seen from an examination of the drawings that the entire left or measuring opening end of the grizzly D is thus supported from the weight sensitive apparatus. To counterbalance the dead weight of the grizzly D, the balance beams 69, 70 are provided with balance weights 73, 74, respectively, positioned to the left of or on the side of the axis of oscillation of the balance beams opposite to the point of affixation or pivoting of the tension bars 55, 56. The balance weights 73, 74 are adjustable longitudinally of the balance beams, and suitable openings 76 in the balance beams alignable with an opening in the balance weights are provided for insertion of a pin or otherwise to fix the position of the counterbalance weights after an adjustment has been effected. The balance weights are preferably adjusted so that one or a plurality of lumps must be resting on the grizzly bars 49 before the balance beams are oscillated to raise the weights and actuate control apparatus to eject the lumps.

For limiting the angle of oscillation of the balance beams 69, 70, there are provided suitable stop members 77, 78 each having an opening of predetermined vertical height through which the corresponding balance beams 69, 70 extend. As shown, the stop members 77, 78 are mounted relative to the forwardly extending I-beams 20, 21, 23, 24 by suitable angle irons 79, 80 welded intermediate the beams 20, 21 and the beams 23, 24, all respectively.

The arrangement is such that should a piece or pieces of material be prevented from passing through the openings 42 and remain on or between the grizzly bars 49, the weight of the piece or pieces will overbalance or raise the counterbalance weights 73, 74 and oscillate the balance beams 69, 70 as shown by the dot-dash lines in Fig. 2. Apparatus to be referred to including the power means F and actuated by movement of the balance beams acts to tilt the grizzly D so as to eject or dispose of the oversize piece or pieces.

The arrangement of the grizzly D for tilting relative to its lever arms 53, 54 and tension bars 55, 56 is such that as the lever arms are rotated in a clockwise direction or to the right and downwardly as viewed in Fig. 2, the end of the grizzly D supported by the tension bars 55, 56 will be raised inasmuch as the length of the tension bars is fixed and the upper pivoted support therefor is relatively fixed, it being movable only to the extent of the limited arc of oscillation of the balance beams 69, 70. At the same time, however, as the grizzly D is being tilted, the moment arm of the tension bars 55, 56 relative to the axis of oscillation of the balance beams remains generally the same such that so long as the piece or pieces to be ejected or dislodged remains on or between the grizzly bars 49, the balance beams will be oscillated and the balance weights 73, 74 held in the raised position. As soon as the piece or pieces are removed from the grizzly D, the balance weights oscillate the balance beams to their normal position and, as will be explained, the grizzly D is returned to the normal slightly tilted position shown.

The power means F shown for tilting the grizzly D comprises compressed air operated mechanism, including a double-acting piston-cylinder arrangement, the cylinder 82 of which is pivotally supported on a bracket 83 fixed to the upright member 11 and the connecting rod 84 of which is pivotally connected to a lever arm 85 welded or otherwise affixed to the shaft 60 on which the lever arms 53, 54 are rotatably supported. Admission of hydraulic fluid or air to the upper side of the piston-cylinder arrangement extends the connecting rod 84 and rotates the lever arms in a clockwise direction, tilting the grizzly D as previously described to the position shown in dot-dash lines in Fig. 2. Admission of air or hydraulic fluid to the lower side of the piston arrangement retracts the connecting rod 84 and rotates the lever arms 53, 54 in the opposite or counterclockwise direction, returning the grizzly D to the normal position shown.

To actuate the piston-cylinder arrangement in the appropriate direction, a control valve 87 is provided mounted on the hopper conveyor frame A and having an operating lever arm 88 connected to an extension 89 on the balance beam 70 by a short tie rod 90. The length of the rod 90 and its point of fastening to the balance beam extension 89 is shown as adjustable.

The control valve 87 is preferably of the four-way control type, having an inlet port communicating through a conduit 92 with a source of compressed air 93 and a pair of outlet ports each communicating with opposite sides of the piston cylinder arrangement through conduits 94, 95, the arrangement being such that either one side or the other of the piston-cylinder arrangement is continuously communicated through the valve 87 with the source of compressed air and the grizzly D is forcefully held in one position or the other. A fourth port on the control valve continuously exhausts the opposite end of the cylinder to which air is being supplied. Alternatively, other power means such as hydraulic, electric or rotary type motors could be provided for actuating the grizzly.

To limit the angular movement of the lever arms 53, 54 and position the grizzly D in either position, the shaft 60 which supports the lever arms 53, 54 for relative rotation is shown provided on is left hand end with a radially extending stop arm 97, which stop arm engages at the predetermined limits of its travel spaced stops 98, 99 supported on bracket members 100 fixed to plate 63 attached to the upright member 10 adjacent to the journal member 61.

The grizzly D shown, when tilted to eject a piece or pieces of material as previously described, is moved laterally of the frame A to a position away from the discharge end of the first or feeder conveyor B. Means is provided for stopping the motor 32 and the first or feeder conveyor B whereby material will not pass from the one conveyor to the other during the time when the grizzly D is tilted to the ejecting position. In the embodiment shown, the means for stopping the motor 32 comprises a limit switch 102 mounted on the bearing supporting plate 63 and having an operating lever arm 103 engageable with and operated by the stop arm 97. Alternatively, the limit switch could be opoperated by the balance beam extension 89 such that when the beam is oscillated, the contacts of the limit switch are opened.

For manual or non-automatic operation, a chain or other hand-operated mechanism (not shown) may be operatively associated with the balance beam extension 89 or the control valve lever arm 88 for actuating the power means F and enabling the grizzly D to be tilted at will or held continuously in either position. Thus the grizzly D can be held in a tilted position while lumps or pieces stuck between the grizzly bars 49 are broken up or dislodged manually or held in an inoperative position, while materials devoid of large lumps are being handled by the conveyors. In the latter case, a switch 105 may be provided to bypass the limit switch 102, permitting continued operation of the conveyor mechanism even though the grizzly D be tiled to an inoperative position.

In operation, the grizzly D is normally in a position to screen or otherwise stop and prevent the passage of oversize lumps of material from passing from the feeder conveyor B to the lower conveyor C. When in such position, the lever arms 53, 54 are in the extreme uppermost position and the stop arm 97 is in its extreme uppermost position and bearing or abutting against the upper stop member 98. With the stop arm 97 in such position, the operating lever arm 103 of the limit switch 102 is engaged thereby and the normally open contacts of the limit switch 102 are in the closed position. The motor 32 preferably runs continuously, driving the treads 27 of the feeder conveyor B in a continuous manner, conveying any loose or raw material placed on the left hand end of the belt as viewed in Fig. 2 to the extreme right thereof where the material falls by force of gravity over the end of the feeder conveyor through the measuring openings 42 of the grizzly D and thence onto the continuous lower conveyor C. To start the motor 32 rotating and operate the feeder conveyor, a starting switch 106 (see Fig. 6) is provided, manual actuation of which closes its normally open contacts 107, completing a circuit from a suitable source of electrical energy through wire 108, the now closed contacts 107, wire 109, the now closed normally open contacts 110 of the limit switch 102, wire 111, and thence through the actuating coil 112 of the motor starting relay 113 to the wire 114 which connects with the opposite terminal of the source of electrical energy. Energization of the actuating coil 112 closes the normally open contacts 115, 115 of the starting relay 113, completing a circuit from the wire 108 through the now closed contacts 115, an overload coil 118, and the wire 119, to one terminal of the motor 32. Closing of the contacts 116 completes a circuit from the wire 114 through the now closed contacts 116, an overload coil 120, and wire 121 to the opposite terminal of the motor 32.

If it be assumed that one or a plurality of pieces or lumps of material too large to pass through the measuring openings 42 are lodged on or between the grizzly bars 49 such as to actuate the weight sensitive apparatus E, the weight of such lumps is transmitted to the weight sensitive apparatus E through the tension bars 55, 56 and the balance arms 69, 70 are oscillated against the weight of the balance weights 73, 74 to the position shown generally in dot-dash lines in Fig. 2. Oscillation of the balance arm actuates the control valve 87 admitting compressed air from the source 93 through the conduits 92, 94 to the upper side of the piston-cylinder arrangement whereby the connecting rod 84 is extended and the lever arms 53, 54 supporting the right or discharge end of the grizzly D are rotated in a clockwise direction as viewed in Fig. 2. Rotation of the lever arms 53, 54 moves the right or discharge end of the grizzly D laterally of the frame A to the right and downwardly. The left or measuring end of the grizzly D, by virtue of the fact that its supporting tension bars are pivoted from a directly overhead relatively fixed support, moves to the right and upwardly, the resultant position being as shown in the dot-dash lines in Fig. 2. As the lever arms 53, 54 are rotated, the stop arm 97 is similarly rotated to engagement with the lower stop 99, rotation of the stop arm 97 acting to disengage the lever arm 103 of the limit switch 102, thus opening its normally closed contacts, de-energizing the actuating coil 112 of the starting relay 113, and stopping the motor 32. When the grizzly D is in the tilted position, the feeder conveyor belt is stopped whereby no material is discharged therefrom onto the lower conveyor C. Return of the grizzly D closes the contacts of the limit switch 102 and restarts the motor 32.

If it is desired to have the grizzly D remain in the tilted or discharging position while the conveyor mechanisms continue to operate, the normally open contacts 123 of the bypass switch 105 may be manually closed, thus continually completing a circuit from the wire 109 to the wire 111, even though the normally closed contacts 110 of the limit switch 102 be in the open position.

From the above it will be seen that an embodiment of the invention has been described which accomplishes the objects of the invention hereinbefore enumerated and others, and that there has been provided a grizzly of the tilting type automatically operable to eject oversize lumps or large pieces in a simple and expeditious manner and to prevent flow of material thereto except when the grizzly is in its operative or screening position. While in the embodiment shown the grizzly is placed between two endless conveyors, one discharging onto the other, it is to be understood that the grizzly may be placed at the discharge end of any type of conveyor and the material passing through the grizzly may discharge onto a floor or the like, or into any type of material handling apparatus.

Although in accordance with the provisions of the patent statutes this invention is described as embodied in a concrete form and structure and the principle thereof has been described together with the best mode in which it is now contemplated applying that principle, it will be understood that the apparatus shown and described is merely illustrative and that the invention is not limited thereto, since alterations and modifications differing materially in appearance and structure will readily suggest themselves to persons skilled in the art without departing from the true spirit of this invention or from the scope of the annexed claims.

Having thus described my invention, I claim:

1. In a continuous automatic material handling system, a generally horizontal grizzly supported for tilting movement, a power operated feed mechanism adapted to feed material to be screened onto said grizzly, power means for tilting said grizzly for emptying the grizzly of oversize material, control mechanism for said power means comprising a balance supporting a portion of said grizzly and responsive to weight of material on said grizzly for actuating said power means to tilt the grizzly from its horizontal position, and control means for said power operated feed mechanism operatively connected with said grizzly for interrupting operation of said feed mechanism when said grizzly is tilted.

2. In a continuous automatic material handling system, a generally horizontal grizzly supported for tilting movement, power means for tilting said grizzly for emptying said grizzly of oversize material, and control mechanism for said power means comprising a balance operatively connected with and supporting a portion of said grizzly and responsive to a predetermined weight on said grizzly for actuating said power means to tilt the grizzly from its horizontal position.

3. In a continuous automatic material handling system, a generally horizontal grizzly supported for tilting movement, power operated material feeding means for feeding material onto said grizzly, power means for tilting said grizzly and emptying the grizzly of oversize material, control mechanism for said power means comprising a balance operatively connected with and supporting a portion of said grizzly and responsive to weight of material on said grizzly for actuating said power means to tilt the grizzly from its horizontal position, and means operatively connected with said grizzly and actuated when said grizzly is tilted for controlling said power operated material feeding means.

4. In a continuous automatic material handling system, a generally horizontal grizzly, means supporting said grizzly for tilting movement, said means including a member pivotally supported at one end and connected to the grizzly at the other end, power means for tilting said grizzly for emptying the grizzly of oversize material, a balance device for controlling said power means, said balance device supporting one end of the grizzly, and mechanism operated by said power means for moving said grizzly laterally with respect to the axis of the pivotal support for said member.

5. In a continuous automatic material handling system, a generally horizontal grizzly supported for tilting movement, power actuated means to tilt said grizzly for emptying the grizzly of oversize material, a balance device for controlling said power actuated means, a member interconnecting said balance device and grizzly for supporting one end of said grizzly, said member being pivotally supported by said balance device, and mechanism operated by said power actuated means for moving said grizzly laterally with respect to the axis of the pivotal support for said member.

6. In a continuous automatic material handling system, a grizzly, means for supporting said grizzly comprising, a member pivotally supported at one end above said grizzly and pivotally connected at the opposite end thereof to said grizzly, a second member pivotally supported below said grizzly and pivotally connected at the opposite end thereof to said grizzly at a point spaced from the point of connection between said grizzly and the first mentioned member, balance mechanism forming a support for one of said members, power means for moving said grizzly laterally with respect to the axes of the support pivots of said members, and control means actuated by said balance mechanism for controlling operation of said power means.

7. In a continuous automatic material handling system, a grizzly, means for supporting said grizzly comprising, a member pivotally supported at one end above said grizzly and pivotally connected at the opposite end thereof to said grizzly, a second member pivotally supported below said grizzly and connected at the opposite end thereof to said grizzly at a point spaced from the point of connection between said grizzly and the first mentioned member, balance mechanism forming a support for one of said members, power means for rotating the other of said members on its support pivot, and control means actuated by said balance mechanism for controlling operation of said power means.

8. In a continuous automatic material handling system, a grizzly, means for supporting said grizzly comprising, a member pivotally supported at one end above said grizzly and pivotally connected at the opposite end thereof to said grizzly, a second member pivotally supported below said grizzly and pivotally connected at the opposite end thereof to said grizzly at a point spaced from the point of connection between said grizzly and the first mentioned member, balance mechanism forming a support for the first mentioned member, power means for moving said grizzly laterally with respect to the axes of the support pivots of said members, and control means actuated by said balance mechanism for controlling operation of said power means.

9. In a continuous automatic material handling system, a grizzly, means for supporting said grizzly comprising, a member pivotally supported at one end above said grizzly and pivotally connected at the opposite end thereof to said grizzly, a second member pivotally supported below said grizzly and pivotally connected at the opposite end thereof to said grizzly at a point spaced from the point of connection between said grizzly and the first mentioned member, balance mechanism forming a support for the first mentioned member, power means for rotating the other of said members on its support pivot, and control means actuated by said balance mechanism for controlling operation of said power means.

10. In a continuous automatic material handling system, a grizzly, means for supporting said grizzly comprising, a member pivotally supported at one end above said grizzly and pivotally connected at the opposite end thereof to said grizzly, a second member pivotally supported below said grizzly and pivotally connected at the opposite end thereof to said grizzly at a point spaced from the point of connection between said grizzly and the first mentioned member, balance mechanism forming a support for the first mentioned member, power means for moving said grizzly laterally with respect to the axes of the support pivots of said members, a power operated feed mechanism adapted to feed material to be screened onto said grizzly, and control means for said power operated feeding means for interrupting operation of said feeding means when said grizzly is tilted.

11. In a continuous automatic material handling system, a grizzly, means for supporting said grizzly comprising, a member pivotally supported at one end above said grizzly and pivotally connected at the opposite end thereof to said grizzly, a second member pivotally supported below said grizzly and pivotally connected at the opposite end thereof to said grizzly at a point spaced from the point of connection between said grizzly and the first mentioned member, balance mechanism forming a support for the first mentioned member, power means for rotating the other of said members on its support pivot, a power operated feed mechanism adapted to feed material to be screened onto said grizzly, and control means for said power operated feeding means for interrupting operation of said feeding means when said grizzly is tilted.

ROBERT W. CRIST.

REFERENCES CITED

The following references are of record in the file of this patent:

UNITED STATES PATENTS

| Number | Name | Date |
| --- | --- | --- |
| 300,481 | Kinzer | June 17, 1884 |
| 956,338 | Green et al. | Apr. 26, 1910 |
| 1,284,034 | Alwart | Nov. 5, 1918 |
| 1,413,934 | Ramsey et al. | Apr. 25, 1922 |
| 1,962,734 | Dupre | June 12, 1934 |
| 2,107,532 | Hallenbeck | Feb. 8, 1938 |
| 2,164,796 | Bird | July 4, 1939 |
| 2,348,372 | Weckerly | May 9, 1944 |
| 2,396,954 | Kranz et al. | Mar. 19, 1946 |